United States Patent Office
2,739,966
Patented Mar. 27, 1956

2,739,966

N¹⁰FORMYLDIHYDROPTEROYLGLUTAMIC ACID AND PROCESS FOR PREPARING SAME

John A. Brockman, Jr., Pearl River, N. Y., and Barbara Roth, Middlesex Borough, N. J., assignors to American Cyanamid Company, New York, N. Y., a corporation of Maine No Drawing. Application March 31, 1950,
Serial No. 153,294

5 Claims. (Cl. 260—251.5)

This invention relates to new substances having biological activity and to processes of preparing the same.

In 1948, Sauberlich and Baumann, Journal of Biological Chemistry, 176, p. 165, 1948, recognized the existence of a substance that stimulated the growth in a synthetic medium of *Leuconostoc citrovorum*. This unknown substance was found to be present in commercial liver extracts and also in liver and a wide variety of natural materials. Subsequent work has shown that the growth factor was not pteroylglutamic acid, vitamin $B_{12}$, or any of the other previously recognized vitamins that occur in liver and other natural products. It has also been subsequently found that the unknown substance can replace the folic acid requirement of micro-organisms and chicks. It has further been found that the growth factor will reverse the action of pteroylglutamic acid antagonists and, surprisingly will reverse the toxic effects of aminopterin (N-[4{[(2,4-diamino-6-pyrimido[4,5-b]-pyrazyl) methyl] -amino} benzoyl] glutamic acid) in mice and bacteria, under conditions in which pteroylglutamic acid is ineffective.

The citrovorum factor exists in natural products in extremely minute quantities so that its recovery therefrom is exceedingly difficult and practically impossible from a commercial point of view. However, we have discovered that it is possible to prepare compounds having the same or related biological activity by a process which makes the production of adequate amounts of the activity a commercial possibility so that it may be used in medicine. Since the chemical structure of the *Leuconostoc citrovorum* growth factor described by Sauberlich et al. has not been elucidated as yet, it is not possible to say at this time whether any of the products produced by the process described hereinafter are the same or not, even though they have the same biological activity. Insofar as we are aware, however, the products covered by the present invention are new.

The new compounds of the present invention may be prepared by reduction of certain known compounds which have been previously prepared and some of which have been described in the literature. The starting materials that may be used in the process of the present invention to prepare the new compounds include formyl pteroic acid and its salts and amino acid amides, particularly N - [4-{[(2 - amino - 4-hydroxy-6-pyrimido[4,5-b]-pyrazyl) methyl] -formamido} benzoyl] glutamic acid. This latter compound may be made by several methods including that described by Gordon et al. in the Journal of the American Chemical Society, 70, p. 878, 1948. By this method formylpteroylglutamic acid is prepared by heating 98% formic acid and acetic anhydride with folic acid (pteroylglutamic acid) for one hour at 100° C. The volatile reactants are removed under vacuum and a light yellow product is precipitated from an alkaline solution by acetic acid. Other formyl derivatives of pteroic acid and its amino acid amides may be prepared by the same general process. In addition to the above, we may also use the corresponding derivatives of aminopterin, which vary structurally only in having an amino radical in the 4 position on the pyrimido ring.

The above compounds may be represented by the following general formula

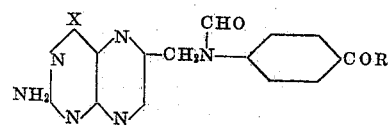

in which R is a hydroxy group or a radical of an amino acid, preferably glutamic acid, or a peptide of glutamic acid such a glutamylglutamic acid, glutamylglutamylglutamic acid, hexaglutamylglutamic acid, or the like. The amino acid radical may however be of another amino acid such as aspartic acid, glycine, alanine, serine, or the like. X represents the radical OH, $NH_2$, or NHR, in which $R_1$ is an alkyl group such as methyl, ethyl, etc. Of course, the salts of the compounds illustrated by the general formula above may be used in the process if desired.

The exact structure of the new compounds produced by reduction of the above formyl compounds has not been definitely determined as yet in view of their complex nature. It is believed, however, that they may be represented by one of the following formulae.

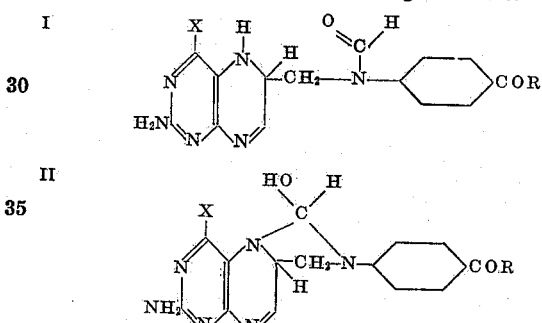

In these, X and R are as defined above. It will also be understood that the above may exist in tautomeric forms depending upon the conditions in which they are present. Both forms illustrated above where X is an OH radical may be regarded as reduced formyl pteroic derivatives which may exist in the open (I) or closed (II) tautomeric form.

The reduction of the formyl compounds by which the new products of the present invention are prepared may be conducted either with or without the aid of catalysts. When using a catalytic reduction a wide variety of solvents may be used in the process, including water, formic acid, alcohol, glycol, acetic acid, dimethylformamide, and others, depending, of course, upon the nature of the catalytic agent. The temperature of the reduction may occur over wide range of temperatures from about 0° C. to about 150° C. The pH may vary over a range (in aqueous medium) from about pH 4 to pH 11.

Many different reduction catalysts may be employed in the process and several of these are illustrated in the specific examples which follow.

Generally speaking, the reaction occurs quite rapidly and appreciable yields of the desired product can be obtained in as little time as 10 minutes at room temperature using, for example, platinum in formic acid. Usually the reduction is carried out within a period of from 30 minutes to two hours.

Although numerous specific examples of catalytic reduction are given hereinafter, a generally preferred procedure of preparing the new compounds of the present invention is as follows. In this, the starting material is pteroylglutamic acid or pteroic acid, or an amide thereof.

This material is first formylated by heating in 20 parts of 90–100% formic acid for 30 minutes to one hour at 80–95° C. The formyl compound thus prepared may be isolated if desired and the reduction completed in a different solvent. However, it is generally more convenient to continue the reduction by cooling the solution and adding the catalyst to the solution, after which hydrogen may be passed into the reaction mixture with shaking or stirring. In some cases, it may be advantageous to activate the catalyst with hydrogen before mixing with the formylated pteroylglutamic acid although this procedure is not necessary. The pressure of hydrogen in the reaction vessel may be from 1 to 100 atmospheres or more, but ordinarily 2 or 3 atmospheres pressure are sufficient to obtain a good yield. After the reduction, the catalyst is removed by filtration, the solution is buffered in aqueous sodium bicarbonate and the resulting solution is found to contain the active material. When desirable to remove the excess formic acid from the reduction solution after removal of the catalyst, the solution can be poured into ether and the insoluble active product isolated by filtration.

When using reduction methods employing metals or metal combinations such as sodium amalgam, zinc, aluminum amalgam, sodium borohydride, magnesium amalgam, magnesium, and the like, the solvent is usually water or of an essentially aqueous nature in which alcohol, benzene, or the like, may be present. The pH of the solution may range from about 3 to 12, the preferred conditions varying with the particular reducing agents used. The temperature may vary from about 10 to 100° C. and the time required will vary from approximately 10 minutes to 4 hours or more.

The reduced formylpteroylglutamic acid prepared as described above may be obtained in the form of a yellow crystalline solid. The compound is stable in 0.1 N NaOH even when heated for thirty minutes at 100° C. In aqueous solution at pH 2 at room temperature it is rapidly converted to a material having the same biological activity as pteroylglutamic acid. The active material is adsorbed on various adsorbing agents, such as magnesium silicate, and these may be used to purify the crude reactions products by chromatographic adsorption methods.

Various processes of obtaining the biologically active materials of the present invention by reduction methods will now be described in the following examples. All parts are by weight unless otherwise stated.

*Example 1*

One part of pteroylglutamic acid is dissolved in 24 parts of 98–100% formic acid and heated one hour on the steam bath. After cooling, 0.25 part of platinum oxide catalyst is added, and the solution hydrogenated two hours at approximately 35 lbs. hydrogen pressure. The catalyst is filtered off, and the solution poured into a mixture of 40 parts of sodium bicarbonate and 300 parts of water. An aliquot of this solution equivalent to one millimicrogram per gram of the starting material in two ml. of culture medium is required for ½ maximum growth of *Leuconostoc citrovorum*.

*Example 2*

The reaction described in Example 1 is repeated using 90% formic acid. Substantially the same results are obtained.

*Example 3*

One part of formylfolic acid (formylpteroylglutamic acid) is dissolved in fifty parts of water at a slightly alkaline pH, and the pH then adjusted to 7. One half part of platinum oxide catalyst is added to this solution, which is then reduced for two hours at approximately 35 lbs. hydrogen pressure. The catalyst is then filtered off and the pH again adjusted to 7. The solution contains the *Leuconostoc citrovorum* growth factor.

*Example 4*

One part of formylfolic acid is reduced as described in Example 3, using 2 parts of 10% palladium on charcoal as the catalyst. The *L. citrovorum* growth factor is produced as before.

*Example 5*

Two parts of formylfolic acid in 100 parts of water at pH 7 are reduced in the presence of Raney nickel catalyst for two hours at 12.0 C. and 1500 lbs. pressure. Approximately the same yield of the *L. citrovorum* factor is obtained as in Example 3.

*Example 6*

One part of formylfolic acid in twenty-one parts of acetic acid which has first been heated to dissolve some of the formylfolic acid is hydrogenated for 2 hours using 0.25 part of platinum oxide catalyst. Most of the undissolved formylfolic acid goes into solution as the reaction proceeds. The catalyst is removed, and the solution poured into an excess of aqueous sodium bicarbonate. This solution contains the active substance required for maximum growth of *L. citrovorum*.

*Example 7*

2½ parts of formylfolic acid is dissolved in 50 parts of a 10% aqueous solution of sodium carbonate and the solution then is diluted to 125 parts with water. 30 parts of 2% sodium amalgam is added. Carbon dioxide is then passed through the solution with stirring. Over a period of one hour, three portions of sodium amalgam, 16 parts each, are added. The crude product that is obtained is effective in promoting the growth of *L. citrovorum* 8081.

*Example 8*

One part of formylfolic acid is dissolved in 100 parts of a 30% solution of ammonium chloride and excess zinc dust is added to the mixture. The mixture is shaken for one hour and then heated on a steam bath for 10 minutes. The solution contains the *L. citrovorum* growth factor.

*Example 9*

11 parts of aluminum chips are cleaned with sodium hydroxide and hydrochloric acid and are then amalgamated by treatment with mercuric chloride. 10 parts of formylfolic acid dissolved in 1,000 parts of dilute ammonium hydroxide is added and the mixture stirred for two hours. The solution is active in promoting the growth of *L. citrovorum*.

*Example 10*

47 parts of formyfolic acid is dissolved in 2,000 parts of water by adding sodium bicarbonate and sodium hydroxide. The solution is heated on a steam bath and three portions of 10 to 15 parts each of sodium borohydride are added over a period of a few minutes. After heating for 10 minutes the solution was found to contain the *L. citrovorum* growth factor.

*Example 11*

10 parts of magnesium salt of formyfolic acid 7½ parts of platinum oxide, and 2,000 parts of water are heated to 80° C. in a water bath. Hydrogen gas is bubbled through the mixture for 45 minutes. At the end of this time the solution was found to be active in promoting the growth of *L. citrovorum* 8081.

*Example 12*

.25 part of magnesium formyfolate is dissolved in 12.5 parts of hot water and 0.22 part of glacial acetic acid. To this is added 0.03 part of magnesium which has been treated with mercuric chloride. The mixture is refluxed until the magnesium is dissolved. The solution contains the growth factor.

Example 13

5 parts of magnesium formylfolate, 200 parts of water and 0.9 part of magnesium metal are refluxed together. Glacial acetic acid is added periodically to maintain vigorous bubbling, until 5 parts has been added. After the magnesium has dissolved, the solution is refluxed for 10 minutes. The product obtained by this procedure as well as that of the preceding examples is represented by one of the general formulae on column 2 when X is OH and R is the radical of glutamic acid.

Example 14

1 part of 90.4% folic acid is dissolved in 20 parts of 98–100% formic acid at room temperature. To this is added 0.25 part of platinum oxide and the mixture is hydrogenated for two hours at 35 lbs. hydrogen pressure. The platinum is filtered off and the solution buffered in excess sodium bicarbonate solution. This product is active in promoting the growth of *Leuconostoc citrovorum* 8081.

Example 15

2 parts of 73% aminopterin is heated for one hour on the steam bath in 40 parts of 98–100% formic acid. Half of this solution is poured into sodium bicarbonate solution and saved, and the remainder is reduced for two hours with 0.25 part platinum oxide catalyst at 35 lbs. hydrogen pressure. The platinum is filtered off, and the solution poured into sodium bicarbonate solution. The solution that is not reduced is devoid of growth promoting activity and completely inhibits the growth of *L. citrovorum*.

Example 16

One part purified formyl pteroylglutamic acid was slurried in 50 volumes dimethylformamide, 0.25 part platinum oxide added, and reduction with hydrogen carried out in a laboratory shaker. After 3½ hours at 25 to 30° C., hydrogen pressure dropped from 37.5 lbs. to 36.75 lbs. The catalyst was filtered off and washed with 10 volumes of dimethylformamide. The mother liquor and wash was diluted slowly with 500 volumes dry ether. A cream colored solid precipitated. This was filtered off, washed with dry ether and air dried; weight 0.29 part. This solid possessed activity in the promotion of growth of *Leuconostoc citrovorum* 8081.

Example 17

One part purified formylpteroylglutamic acid was dissolved in 20 volumes 90% formic acid and cooled to 0 to 5° C. Then 2.0 parts powdered zinc was added. The solution immediately developed a dark orange color, which became deep yellow after several minutes. The solution was kept at 0 to 5° C. for one-half hour with occasional stirring. After removal of the excess zinc by filtration, the deep yellow filtrate was poured into a slurry of 250 volumes water and 50 parts sodium bicarbonate. The resulting solution possessed activity for promoting the growth of *Leuconostoc citrovorum* 8081.

Example 18

One part purified formylpteroylglutamic acid was slurried in 20 volumes dry ethylene glycol and heated to 100° C.; an almost complete solution resulted. On cooling to 20° C., the formylpteroylglutamic acid precipitated in a finely divided form. This slurry was transferred to a laboratory reduction apparatus, 20 volumes ethylene glycol and 0.25 part platinum oxide were added, and reduction carried out for one hour at 25 to 30° C. During this time the hydrogen pressure dropped from 36 to 35 pounds. The catalyst was filtered off and the deep yellow filtrate drowned into a slurry of 150 volumes water and 10 parts sodium bicarbonate. The resulting solution possessed activity for promoting the growth of *Leuconostoc citrovorum* 8081.

We claim:

1. $N^{10}$formyldihydropteroylglutamic acid.

2. A process which comprises the step of subjecting $N^{10}$formylpteroylglutamic acid to the action of platinum oxide and hydrogen until one mol of hydrogen is absorbed by one mol of said $N^{10}$formylpteroylglutamic acid, and thereafter recovering $N^{10}$formyldihydropteroylglutamic acid.

3. A process which comprises the step of subjecting $N^{10}$formylpteroylglutamic acid to the action of hydrogen until one mol of hydrogen is absorbed by one mol of said $N^{10}$formylpteroylglutamic acid, and thereafter recovering $N^{10}$formyldihydropteroylglutamic acid.

4. Compounds of the group consisting of the dihydro form of compounds having the structure:

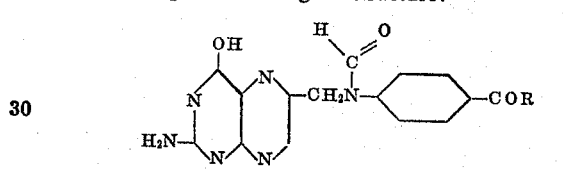

in which —COR is a member of the group consisting of carboxylic acid, carbonylaspartic acid, carbonylglutamic acid, carbonylglutamylglutamic acid, carbonylglutamylglutamylglutamic acid radicals and the cationic salts thereof.

5. A process of preparing the dihydro form of compounds having the structure:

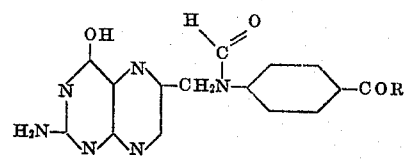

in which —COR is a member of the group consisting of carboxylic acid, carbonylaspartic acid, carbonylglutamic acid, carbonylglutamylglutamic acid, carbonylglutamylglutamylglutamic acid radicals which comprises subjecting said compounds to the action of hydrogen until one mol of hydrogen is absorbed for each mol of said compound and thereafter recovering the dihydro form of said compound.

References Cited in the file of this patent

UNITED STATES PATENTS 2,500,296   Waller et al. _____ Mar. 14, 1950

OTHER REFERENCES

O'Dell et al.: J. Am. Chem. Soc., 69, 250–53 (1947).
Wold et al.: J. Am. Chem. Soc., 69, 2753–59 (1947).